(12) United States Patent
Yung et al.

(10) Patent No.: US 9,641,332 B1
(45) Date of Patent: May 2, 2017

(54) PRIVACY-PRESERVING MEASUREMENTS OF A CAMPAIGN

(71) Applicant: GOOGLE INC., Mountain View, CA (US)

(72) Inventors: Marcel M. M. Yung, New York, NY (US); Tomasz Czajka, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 1015 days.

(21) Appl. No.: 13/754,433

(22) Filed: Jan. 30, 2013

(51) Int. Cl.
*G06Q 20/00* (2012.01)
*H04L 9/30* (2006.01)

(52) U.S. Cl.
CPC ..................................... *H04L 9/30* (2013.01)

(58) Field of Classification Search
USPC .......................................................... 705/71
See application file for complete search history.

(56) References Cited

U.S. PATENT DOCUMENTS

| 8,060,398 | B2 | 11/2011 | Canning et al. | |
|---|---|---|---|---|
| 8,412,837 | B1 * | 4/2013 | Emigh | H04L 9/30 705/65 |
| 2008/0294996 | A1 * | 11/2008 | Hunt | G06Q 30/02 715/739 |
| 2012/0166272 | A1 | 6/2012 | Wiley et al. | |
| 2012/0239491 | A1 | 9/2012 | Kruglick | |

OTHER PUBLICATIONS

Tyson, Joey. "Relevant Ads That Protect Your Privacy." Sep. 30, 2012. http://www.facebook.com/notes/facebook-and-privacy/relevant-ads-that-protect-your-privacy/4578276242.

Ha, Anthony. "Facebook's Brad Smallwood Offers More Data on Ad Effectiveness, Says Datalogix Partnership Isn't a Privacy Risk." Oct. 1, 2012. http://techcrunch.com/2012/10/01/facebook-brad-smallwood-datalogix/.

(Continued)

*Primary Examiner* — John Hayes
*Assistant Examiner* — John M Winter
(74) *Attorney, Agent, or Firm* — Procopio, Cory, Hargreaves & Savitch LLP (57) ABSTRACT

A method of measuring a campaign performance includes transforming identifiers into non-identifiers, and providing the non-identifiers to an external processing party; receiving encrypted non-identifiers comprising the non-identifiers after encryption by the external processing party, other non-identifiers, spending values, and a public cryptographic key, each member of the other non-identifiers being associated with a corresponding member of the spending values; encrypting the non-identifiers to generate other encrypted non-identifiers, and determining an intersection of the encrypted non-identifiers and the other encrypted non-identifiers to generate common encrypted non-identifiers; identifying a subset of the spending values associated with members of the encrypted non-identifiers in the common encrypted non-identifiers; and deriving a total spending value based on the subset of the spending values.

6 Claims, 6 Drawing Sheets

(56) References Cited

OTHER PUBLICATIONS

Electronic Frontier Foundation. "A Deep Dive into Facebook and Datalogix: What's Actually Getting Shared and How You Can Opt Out." Sep. 25, 2012. https://www.eff.org/deeplinks/2012/09/deep-dive-facebook-and-datalogix-whats-actually-getting-shared-and-how-you-can-opt.
Hill, Kashmir. "Facebook Lays Out All of Its New Targeting Techniques in One Easy-to-Read Blog Post." Oct. 1, 2012. http://www.forbes.com/sites/kashmirhill/2012/10/01/facebook-lays-out-all-of-its-new-targeting-techniques-in-one-easy-to-read-blog-post/.
Biddle, Sam. "Here's the Annoying New Way Facebook Makes Monery Off Your Life." Oct. 1, 2012. http://gizmodo.com/5947901.

* cited by examiner

PRIVACY-PRESERVING MEASUREMENTS OF A CAMPAIGN

BACKGROUND

1. Technical Field

Aspects of the example implementations relate to measurement of campaign performance between a first party (e.g., campaign promoter) and a second party (e.g., merchant), without a third party, and without providing user identification information to the campaign promoter, and without providing sensitive information of the first party to the second party, and vice versa.

2. Related Art

A merchant may offer a good or service, or other benefit to a consumer. In exchange, the consumer provides a payment to the merchant. The merchant may seek to increase sales by using a campaign promoter to operate a campaign by providing a coupon that advertises the merchant and incentivizes the transaction, and providing the consumer with a way to use the coupon and purchase from the merchant. The campaign promoter and the merchant may measure the success of the campaign from sales information, such as credit card number of the transaction by the consumer, the credit card number being known by the merchant and the campaign promoter and the payment by this credit card can be measured as part of the success of the campaign.

To process the campaign effectiveness measurement and obtain the credit card numbers associated with the effectiveness of the campaign, the campaign promoter and the merchant may use a third-party company. The method applies hashing of credit card numbers to perform the processing, e.g., a hash applied on the set of credit cards as a deterministic mapping, and each party sends to the third party a list of hashed credit cards, or alternatively, the third party itself hashes the credit cards. However, because the hashing is not randomized, an unauthorized party with access to the lists of hashed credit cards, and additional access to list of credit cards, can hash the credit card number (i.e., the name of the users in the campaign), check the hashed name in the list against a list of credit cards, and recognize the actual credit cards used in a list of hashed credit cards. Further, because a hash translation can be computed, the hashing technique applied by or for the third party company may not provide sufficient security and privacy.

Additionally, the third-party company must be a trusted party (e.g., trusted not to use availability of credit card lists to perform the foregoing credit card identification). Therefore, there is a risk that the third-party company may reveal information (intentionally or unintentionally) without authorization by the user. Moreover, the existence of the third-party having access to the credit card information (or the list of hashed credit cards) that is needed to assess the effectiveness of the campaign may pose a risk of revealing too much information about the effectiveness of the campaign to that third party, which may harm the campaign promoter, as well as revealing too much information about the consumer, which may harm the consumer and the merchant.

Additionally, the third-party function can be implemented in tamper-proof hardware devices at the two parties themselves. However, again, the two parties cannot access the logic of the devices, and the devices may, for example, leak information to other parties, without the parties controlling the devices being notified.

SUMMARY

Aspects of the example implementations include, but are not limited to, a computer-implemented method, that includes transforming a set of identifiers into a set of non-identifiers, and providing the set of non-identifiers to an external processing party; receiving a set of encrypted non-identifiers that comprises the set of non-identifiers after encryption by the external processing party, another set of non-identifiers, a set of spending values, and a public cryptographic key, wherein each member of the another set of non-identifiers is associated with a corresponding member of the set of spending values; encrypting the set of non-identifiers to generate another set of encrypted non-identifiers, and determining an intersection of the set of encrypted non-identifiers and the another set of encrypted non-identifiers to generate a set of common encrypted non-identifiers; identifying a subset of the set of spending values associated with members of the set of encrypted non-identifiers in the set of common encrypted non-identifiers; and deriving a total spending value based on the subset of the set of spending values.

Additionally, a computer-implemented method is provided that includes transforming a set of identifiers into a set of non-identifiers; encrypting, using a public cryptographic key, spending information associated with the set of identifiers to generate a set of spending values, each of the spending values associated with corresponding ones of the set of non-identifiers; providing the set of non-identifiers, the set of spending values, and the public cryptographic key to an external processing party; receiving encrypted spending information associated with at least a subset of the set of spending values; decrypting the spending information using a private cryptographic key associated with the public cryptographic key to generate decrypted spending information; and providing the decrypted spending information to the external processing party.

Further, a computer-implemented method is provided that includes at a first processing party, transforming a set of identifiers into a set of non-identifiers, and providing the set of non-identifiers to a second processing party; at the second processing party, transforming another set of identifiers into a set of non-identifiers; at the second processing party, encrypting, using a public cryptographic key, spending information associated with the set of identifiers to generate a set of spending values, each of the spending values associated with corresponding ones of the set of non-identifiers; receiving from the second processing party a set of encrypted non-identifiers that comprises the set of non-identifiers after encryption by the external processing party, the another set of non-identifiers, a set of spending values, and a public cryptographic key, wherein each member of the another set of non-identifiers is associated with a corresponding member of the set of spending values; at the first processing party, encrypting the set of non-identifiers to get another set of encrypted non-identifiers, and determining an intersection of the set of encrypted non-identifiers and the another set of encrypted non-identifiers to generate a set of common encrypted non-identifiers; at the first processing party, identifying a subset of the set of spending values associated with members of the set of encrypted non-identifiers in the set of common encrypted non-identifiers; and receiving at the second processing party the encrypted spending information associated with at least a subset of the set of spending values; decrypting at the second processing party the spending information using a private cryptographic key associated with the public cryptographic key to generate decrypted spending information; and at the first processing party, deriving a total spending value based on the decrypted spending information.

A method of determining a value and a volume of a campaign by a campaign organizer, that includes, at the external entity, generating a set of spending values associated with a set of identifiers associated with participation in the campaign previously transformed by the campaign organizer into a set of non-identifiers, transforming another set of identifiers associated with spending at the external entity into another set of non-identifiers, providing to the campaign organizer an encrypted version of the set of the non-identifiers, the another set of non-identifiers, a set of spending values, and a public cryptographic key, wherein the spending information itself is not provided to the campaign organizer. The method further includes, at the campaign organizer, determining an intersection of an encrypted set of the non-identifiers and the another set of encrypted non-identifiers to generate a set of common encrypted non-identifiers, and identifying the volume based on a subset of the set of spending values associated with the set of common encrypted non-identifiers. The method also includes, at the external entity, receiving encrypted spending information associated with at least a subset of the set of spending values, and decrypting the spending information using a private cryptographic key associated with the public cryptographic key to generate decrypted spending information, and at the campaign organizer, deriving the value based on the decrypted spending information.

Also, a computer-implemented method is provided that includes transforming a set of identifiers into a set of non-identifiers, and providing the set of non-identifiers to an external processing party; receiving a set of encrypted non-identifiers that comprises the set of non-identifiers after encryption by the external processing party, another set of non-identifiers, and a public cryptographic key; and encrypting the set of non-identifiers to generate another set of encrypted non-identifiers, and determining an intersection of the set of encrypted non-identifiers and the another set of encrypted non-identifiers to generate a set of common encrypted non-identifiers.

DETAILED DESCRIPTION

The subject matter described herein is taught by way of example implementations. Various details have been omitted for the sake of clarity and to avoid obscuring the subject matter. The examples shown below are directed to structures and functions for implementing measurement of campaign performance with privacy preservation. Aspects of the example implementations may relate to e-commerce, information sharing, privacy preserving methods, encryption and cryptographic methodologies, transaction systems, private information sharing, and secure computing, for example. However, the example implementations are not limited thereto, and may be applied to other fields, without departing from the scope of the present inventive concept.

Campaign and Protocol—Overview of Example Implementation

A campaign facilitated by a campaign promoter P (hereafter referred to as "P") may be fulfilled at a merchant or a representative of a merchant (e.g., a credit card processing company) M (hereafter referred to as "M" (e.g., an online or offline retailer, restaurant, etc.). The campaign may be electronic (e.g., via Internet or other network, including mobile network), but is not limited thereto. P provides a campaign object (e.g., an incentive such as a coupon, advertisement, uniform resource locator (url), or other promotion, including written ads, display ads or mobile ads) associated with the campaign to consumers, which can potentially (but not necessarily) be redeemed by use with M. A user (e.g., human or its agents, such as a consumer) may register with P by providing credit card information, for example by clicking on a mobile advertisement on a mobile communication device (e.g., smartphone) or, for example, by pre-registration to an account at P. For example, a device under the control of the user may interact with P to participate in the campaign, and with M to provide payment and obtain a benefit (e.g., good, service, or other benefit). Then, M collects the payment, which is quantified in a number that is registered at M. Where a credit card is referred to herein, the term may include, but is not limited to, details of a credit card and a user identifier.

Consumers may be identified by a first set of the identifiers (e.g., consumer account, credit card number, credit card name created by a credit card company, credit card shipping address, account identifier at P, a third party email address or other identifier may be substituted therefor as would be understood by those skilled in the art), which indicates participation in the campaign at P, and a second set of the identifiers, which indicates fulfillment of the campaign at M. A mapping between a name in the list of P and the name in the list of M should be known and computable, from one list to the other or vice versa or in both directions; the mapping may be applicable only to a plurality of the names. The example implementation involves a case where the same identifier (same credit card number) is used in both lists.

M may have a list of identifiers (e.g., credit cards) and associated information (e.g., spending), and P may have information on credit cards associated with campaign participation. Overlapping subsets of the first and second sets of identifiers indicate successful fulfillment of P's campaign at M. Conversely, spending information associated with consumer accounts that did not receive the incentive (e.g., non-overlapping subsets of the first and second sets) may also be possible. The foregoing two cases may co-exist.

Information (e.g., spending) can be computed on the overlapping set common to P's list and M's list to measure the campaign effectiveness. This information can include total spending within the group and outside the group (as a control group), and may include average, standard variation, or other statistics, as well as the relative size of campaign participants at M. The set of common credit cards in both lists may stay unknown to P, or in an alternative embodiment and with the consent of the user, may be provided to P. The set of credit cards at M may be required to remain unknown to P and the set of credit cards at P may be required to remain unknown at M. Additionally, the exact size of one list may be required to remain secure from the other party (i.e., that other party may only learn some upper bound on the size of the list).

During and/or after the campaign, P may assess campaign performance via a protocol. P is only provided with information that it can use to derive an overall number of transactions or a transaction histogram of number of users participating in P's campaign as fulfilled at M is provided (actual identifiers such as account numbers or other card identifying information is not provided to P) and spending at M. In the protocol, P is not provided with information on which credit cards are in M's sales list, and M is not provided with information on which credit cards are in P's campaign list. Further, M does not have information on the financial information (total spending) of the common group. If additional information is required to be released, it can be securely added. No other party is provided with any other identifying information on the users, in view of the encryption of the information, and the strength of the cryptography, i.e., communication between interacting parties with cryptographic engines, data logic, and database of transactions in their electronic computing systems.

Based on protocol specifications, one party can program the protocol programs for both parties. For example, P may program the protocol logic of P and M, and may make the program publicly available for public and expert scrutiny (e.g., open source software). The securing of additional information does not necessarily rely on not knowing the program logic specification and implementation.

P can receive information on the performance (e.g., total spending or other statistics), which can be used to assess effectiveness of campaign on the indicated group, and thus overall effectiveness of the campaign (e.g., credit card owners who have received, at a device for example, coupons for promotion).

Example Implementation

Figure 1:
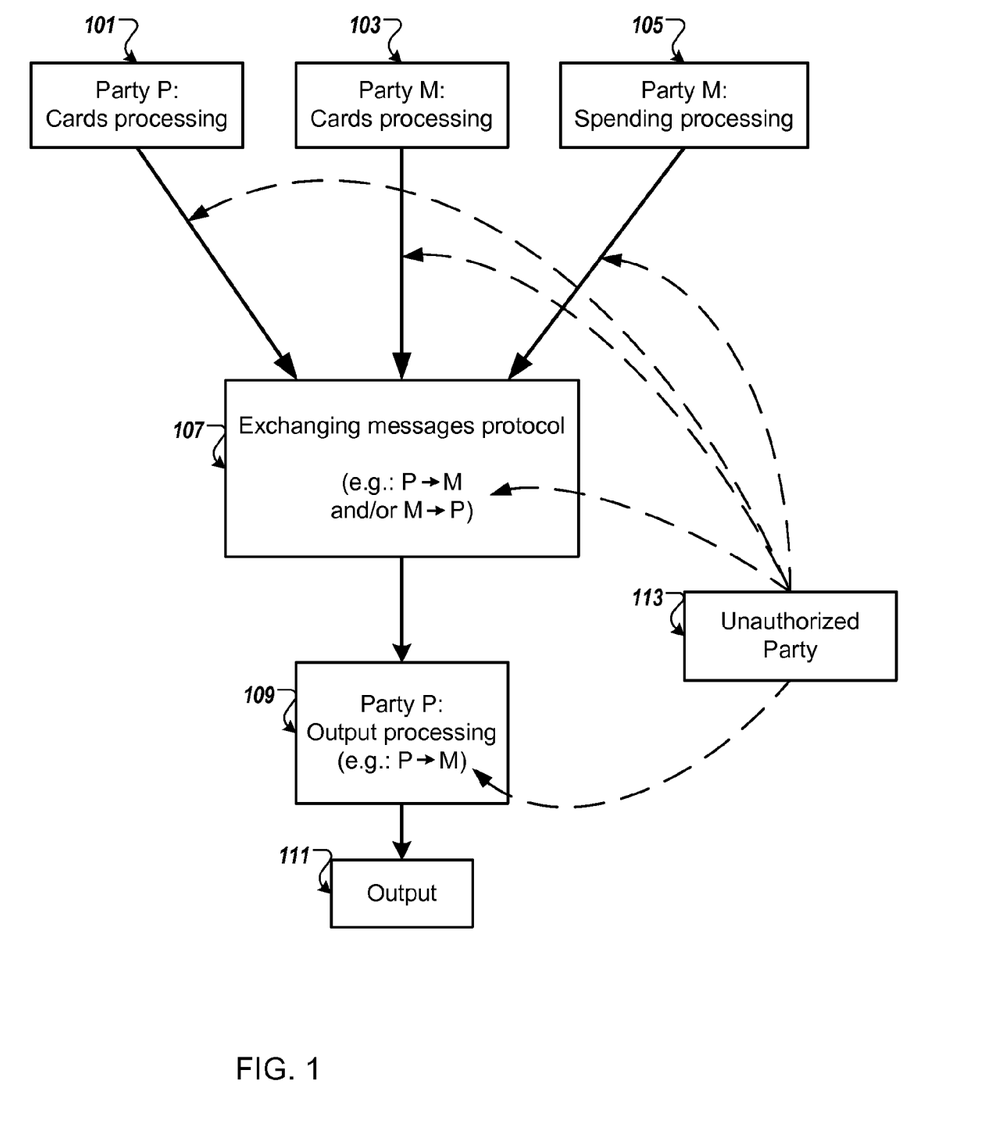
FIG. 1 shows an example implementation of preserving privacy in a campaign.

FIG. 1 illustrates an example implementation of the measurement of the campaign performance. Participation of users in the campaign and its fulfillment may be represented as:

(1) M has a set of credit cards $\{c1, c2, \ldots, cv\}$ and payments $\{p1, p2, \ldots pv\}$, which made by the corresponding customers, represented as the list $<ci,pi>i=1, \ldots, v$, and optionally stored only on M (e.g., at a storage Mstore); and (2) P has a set of credit cards $\{s1, s2 \ldots sw\}$ which are part of the campaign (e.g., received incentives such as a coupon) and optionally stored at P (e.g., a storage Pstore).

At 101, P computes a random representation of its set of credit cards $\{s1 \ldots sw\}$. At 103, M computes a random representation of the set of credit cards $\{c1 \ldots cv\}$, and at 105, M randomly represents its set of payments $\{p1 \ldots pv\}$.

After the foregoing input and computation stages, in a protocol exchange stage at 107, M and P exchange information, and further re-represent the exchanged information randomly. The re-representation includes at least one of re-randomization, drawing random values, computational operations, cryptographic operations, arithmetic operation and permutation of values, and exponentiation performed by M and P. Exponentiation is used in designing ciphers, such as Pohlig-Hallman systems, RSA systems, and others as would be understood in the art.

At 109, P performs output processing, possibly by exchanging information with M. Random permutations in the protocol may be achieved by ordering lists according to the magnitude of the quantity they represent after re-representation: since the values are exponentiated and encrypted, the ordering provides for a random permutation.

Based on the protocol exchange stage, a restricted output is provided to P at 111. More specifically, a randomly represented computed "output" is produced at P as the intended correct result of the exchange. The "output" includes at least one of the total value spent at M by members of $\{c1, \ldots cv\}$ who are also members of the list $\{s1, \ldots, sw\}$ (e.g., members of interest), the size of the plurality of members of interest, the average spending of members of interest, statistical moments of the spending of members of interest, selected functions on spending of members of interest and their spending, a function of spending by members of interest plus the actual names of members of interest, and similar functions on the plurality of members at M which are not members of interest.

As indicated by 113, an unauthorized party may attempt to access information being exchanged; however, the unauthorized party is unable to determine the content of the information, because the information is encrypted or otherwise hidden as explained below.

Figure 2:
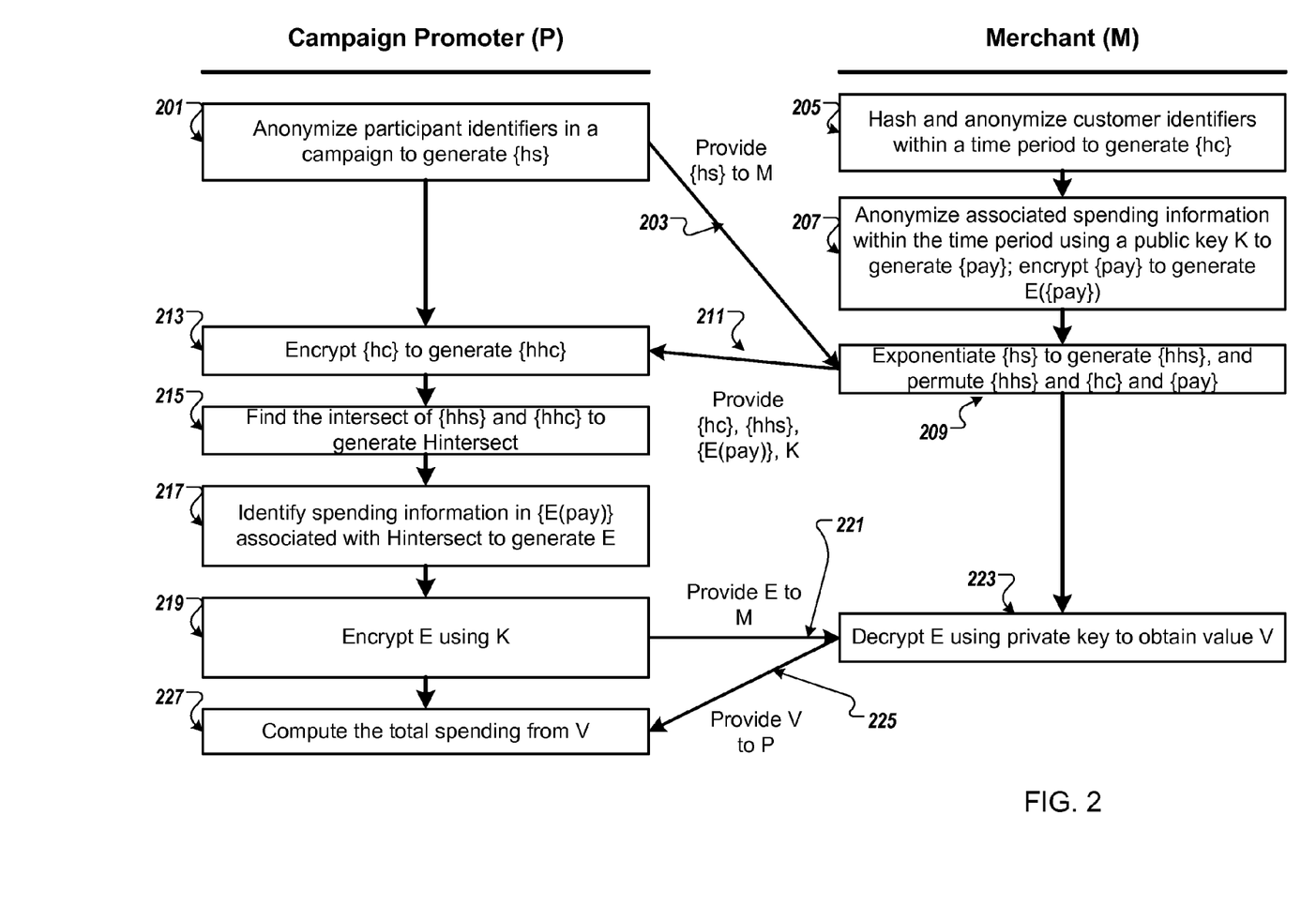
FIG. 2 shows details of an exchange protocol according to the example implementation.
Figure 3:
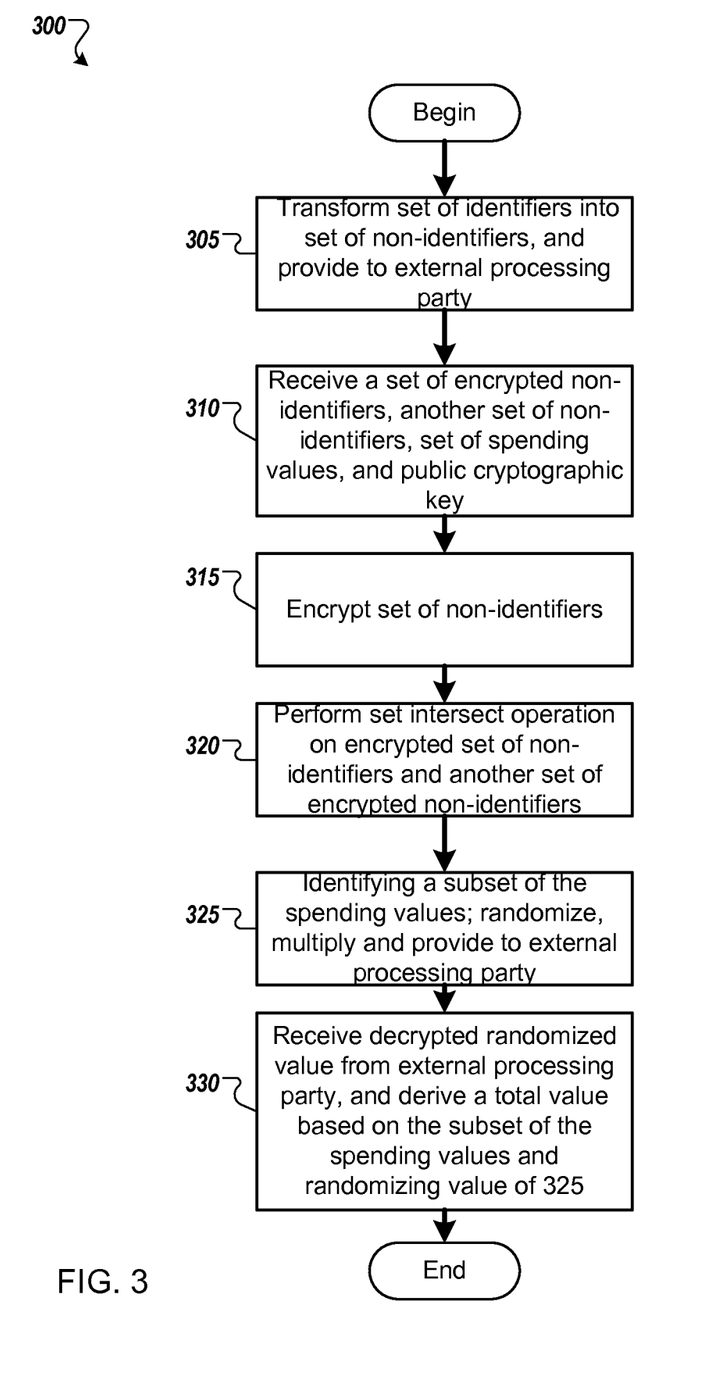
FIG. 3 shows the example implementation under the control of a campaign promoter P.
Figure 4:
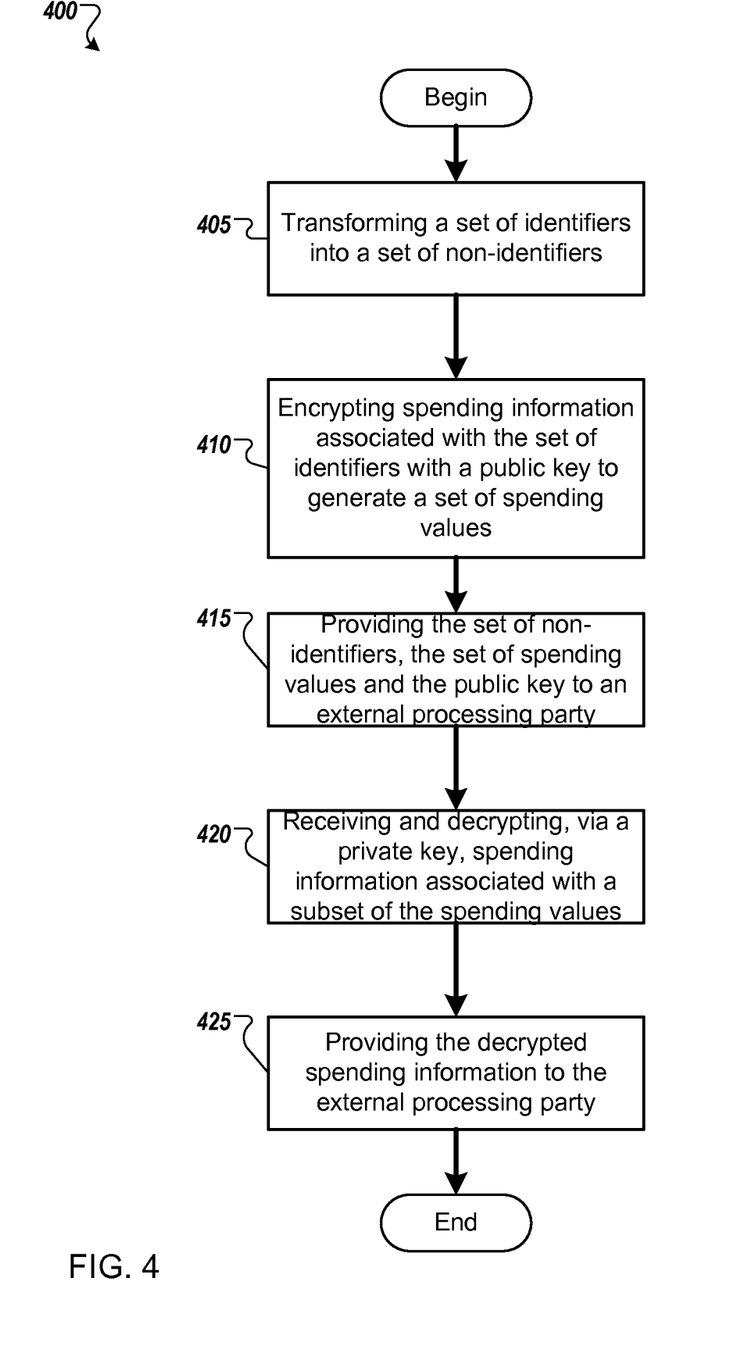
FIG. 4 shows the example implementation under the control of a merchant M.

FIGS. 2-4 further illustrate detailed operations of the example implementation. Some of the operations are performed under the control of P (as further illustrated in FIG. 3 and explained further below) and other operations are performed under the control of M (as further illustrated in FIG. 4 and explained further below). The protocol includes the operations as shown in FIG. 2, and as further disclosed below.

Operation 1 (under control of P): At 201, information is anonymized for identifiers of participants in P's campaign. More specifically, the identifiers are transformed into non-identifiers by performing the following operations:

1.1) on the set of credit cards $\{s1, s2, \ldots, sw\}$ which received the incentive from P, compute the hash function $HH(s1), HH(s2), \ldots, HH(sw)$.

To perform the hash function at P (as well as at M, as explained below), for example, there is defined a group $Z_p$ (numbers mod p) where p is a prime and $p=2q+1$ (q is a prime) and quadratic residues are numbers which have roots mod p (each number has two roots: x and p−x, in this domain), as well as homomorphic encryption of M: E. Further, a hash function is provided into the domain of quadratic residues. A "full domain" hash can be built from existing hash functions on fixed domain (like SHA1 or SHA2 which are known in the art).

One example of such a full domain hash is $HH(c)$, which is built as follows:

(1) generate a pad of bits by concatenating: SHA2(fixed, c), SHA2(fixed+1,c), SHA(fixed+2,c), . . . (i.e., to generate a pad which is random until enough random bits are produced to generate a number in the range $\{1, \ldots, p\}$ to make sure at most two numbers can be mapped; since p is large almost everywhere, the square root is a unique root among the credit cards.

(2) generate pad(c) by taking 2 log p bits of the pad of bits (3) pad(c) $^2$ (mod p) [i.e., square the number mod p]; the symbol ∧ denotes exponentiation.

According to another variation, another value is generated, i.e., SHA3(c) is generated, and the operation (3) above is performed as $pad(c)^{\{2*sha3(c)\}} \pmod{p}$.

The foregoing full domain hashes can be modeled as random public functions (i.e., approximating random oracle function over the domain of quadratic residues mod p), herein referred to as "HH".

1.2) generate a random exponent RP based on a random element mod q (e.g., by choosing a random 2*log(q) bits (log is logarithm base 2) and reducing it mod q (namely performing the mod q operation on it)). RP is the random exponent of P. Choosing of random bits is an operation known in the art, based on random number and pseudorandom number generation.

1.3) exponentiate: $HH(s1)\wedge RP \pmod p$, $HH(s2)\wedge RP \pmod p$, ..., $HH(sw)\wedge RP \pmod p$, defined as set {hs1, hs2, ..., hsw}

Operation 2 (providing the anonymized information from P to M). At 203, a random permutation pi(1) of the set {hs1, hs2, ..., hsw} is provided to M (e.g., an external processing party). Ordering the values of the set is a possible variant before providing the set to M.

Operation 3 (under control of M). At 205, information is anonymized for M's set of identifiers, and at 207, M anonymizes spending information using a public key K to generate a set of spending values. At 209, M encrypts this spending information. More specifically, M transforms the identifiers into non-identifiers according to the following example operations:

3.1) on a set of credit cards {c1, s2, ..., cv} which are lists of credit card each ci is associated with payment: {pay(1), pay(2), ..., pay(v)}, perform computation of HH(c1), HH(c2), ..., HH(cv). The hashing function is performed as explained above.

3.2) generate a random exponent RM based on a random element mod q (done by choosing a random 2q bits and reducing it mod q) (the same way RP was created, which is explained above).

3.3) exponentiate by computing $HH(c1)\wedge RM \pmod p$, $HH(c2)\wedge RM \pmod p$, ..., $HH(cv)\wedge RM \pmod p$, defined as set {hc1, hc2, ..., hcv}

3.4) After being delivered, the set {hs1, hs2, hsw} at 209 is exponentiated by computing $hs1\wedge RM \pmod p$, $hs2\wedge RM \pmod p$, ..., $hsw\wedge RM \pmod p$, defined as set {hhs1, hhs2, ..., hhsw}. Accordingly, the input set from {s1, s2, ..., sw} has been exponentiated once by P in operation 1.3, and here again by M.

3.5) permute the set {hhs1, ... hhsw}, using random permutation pi(2) and permute the set {hc1, ..., hcv} using random permutation p(3). According to an alternate implementation in which P is permitted by the consumer (e.g., user) to be able to have the information with respect to the cards that participated in the campaign, permutation is not performed, and pi(2) is the identity permutation, rather than a random one.

3.6) At 207 encrypt each pay(i) homomorphically and randomly to produce the set of spending values {E(pay(1)), ..., E(pay(v))}, and use permutation p(3) to permute this set. To perform this encryption a private key and a corresponding public key are generated by M. We may employ the Paillier encryption based on N, a multiple of two large primes. For the private key, for example, lambda(N) is the Carmichael function of N is used, a composite number which is a multiple of two large prime numbers, and its generation and utilization as Paillier encryption and decryption keys is known in the art. Note that there are two number theoretic functions associated with composite numbers that may be used for encryption (RSA cryptosystem, Rabin Cryptosystem, Paillier Cryptosystem and their variants: Euler Function Phi, and Carmichael function Lambda), both the encryption methods and the functions are known in the art. The private Paillier (or any) portion of the public key is always maintained only under the control of M.

Note that P never receives the private key, only the public key. Further, P can encrypt but cannot decrypt. Thus M performs decryption in operation 7 below, and Vrand is added in operation below, to obfuscate the spending value from the decrypting party M.

Operation 4 (providing non-identifier information from M to P) At 211, M provides to P the permuted and exponentiated twice non-identifier set {hhs1, ..., hhsw} which is an exponentiation and permutation of the originally received set at 203 from P, and M's own non-identifier once exponentiated and permuted set {hc1, ..., hcv} as well as the permuted (as the previous set) and encrypted spending set {E(pay(1)), ..., E(pay(v))} of associated encrypted payment (e.g., spending values), and the public key K. Note that the exponentiation performed to obtain {hc1 ... hcv} differs from the Paillier encryption scheme adopted to encrypt E(pay(i)), and those values are transmitted from M to P as a vector of two permuted values that hide the credit card payment, but each anonymized credit card is associated with the encrypted payment associated with the transaction of this credit card.

Operation 5 (performed under the control of P): At 213, P encrypts the foregoing non-identifier information of M. At 215, the intersection (and non intersection) of the doubly exponentiated (encrypted) non-identifier of the credit card list of M and the doubly exponentiated (encrypted) non-identifier of the credit card list of P is determined. At 217, encrypted spending information is identified based on the intersect, and the identified spending information is encrypted at 219. These operations are discussed in greater detail below as follows.

5.1) At 213, a calculation is performed to exponentiate $hc1\wedge RP \pmod p$, $hc2\wedge RP \pmod p$, ..., $hcv\wedge RP \pmod p$ to form the set {hhc1, hhc2, ..., hhcv}. For each element in this set, there is also an associated E(pay(i)), which is the second of the two values in the vector, as explained above.

5.2) At 215, a computation is performed to determine which elements hhsi in {hhs1, ..., hhsw} also appear as hhcj is the set {hhc1, hhc2, ..., hhcv}. The intersection between the two doubly exponentiated sets is checked. Since exponentiation and then second exponentiation is a commutative operation, the order does not matter and if ci=sj, their similarly hashed and then doubly exponentiated value will be the same. This enables checking for the intersection among the two sets by identifying identical elements in the two doubly exponentiated lists. These found elements may be referred to as Hintersect.

The intersection between the two doubly exponentiated ordered lists may be performed in a manner similar to merging sorted lists and maintaining only elements common to both lists and the associated encrypted payment.

5.3) At 217, for each hhck element in Hintersect there is an associated E(Pay(k)), i.e., the second vector component (e.g., spending value which is encrypted). This second vector component E(pay(k)) for each of the hhck in Hintersect is multiplied for each member of Hintersect (assume the indices in this set are k1, k2, ..., kr then, multiply E1=E(pay(k1)*E(pay(k2) ... *E pay(kr).

At 219, a random number Vrand is generated and encrypted with the public key (e.g., Paillier key), as Er=E (Vrand). One property of this encryption operation is that a multiplication of the ciphertexts results in the decryption of the cleartexts, e.g., an additive—homomorphic scheme as is known in the art.

5.4) Also at 219, calculation is performed to generate E=E1*Er (which randomizes the additive value encrypted by the value of ciphertext E).

Operation 6: At 221, P provides to M the value of E, which is randomized and encrypted as explained above.

Operation 7 (performed under control of M): At 223, M decrypts E using the private key, and obtains a plaintext value V. When this decryption is performed with Vrand plus the sum of the payments associated with Hintersect (i.e., V=Vrand+pay(k1)+pay(k2)+ . . . +pay(kr)), M cannot identify the sum of the values of payments for elements in Hintersect. The resulting decrypted value is V (i.e., the sum of Vrand and the payments associated with age intersect).

The Paillier Cryptosystem may be a homomorphic encryption. If small integer numbers (e.g., sums in cents) are used (e.g., it is reasonable to assume that the sum of transaction payment is smaller than, say, 100 trillion dollars), it can handle substantial addition operations. The Paillier Cryptosystem is based on arithmetic modulo $n^2$ where $n=p*q$ is an RSA composite which is a multiple of two prime numbers, as is known in the art, and variations thereof are also known in the art. The additive El Gamal is also an additive homomorphic encryption that is another alternative for the encryption function of the payments. When one uses over quadratic elements modulo p, and the encryption is an exponent of a generator, then it has additive properties. Further, decryption involves taking a discrete log (which is possible if added numbers are small). For example, a baby-step—giant-step algorithm may be applied (the exact cryptographic formula is available in the art).

Operation 8: At 225, M provides to P the value V, and optionally, proof that V is the correct answer, by showing the randomness used in the ciphertext E.

Operation 9: At 227, P, having received V, computes the value of the campaign as (V minus Vrand) as an integer operation; P already has the information that Vrand was added to the sum from operations 5.3 and 5.4 above. Thus, P can subtract Vrand from V, to obtain the real sum of the payments in Hintersect. This achieves the result of the protocol where P calculated the total spending and number of credit card transactions in the campaign and nothing else since the rest of the information is encrypted. In case the set of credit card that was originated and exponentiated at P was not permuted by M, P may also be informed of the extra information of which the credit card engaged in the transaction, and nothing more. M does not learn anything; and an unauthorized party that attempts to access this information cannot obtain the information, since the exponentiated values and encrypted values are secure.

The example implementation n to generate the intended "output" from the exchange protocol at P and P's input, as well as the exchange protocol at M and M's input, is achieved by the employment of at least one of (pseudo) random functions, random and pseudorandom generators, one-way function, cryptographic function, encryption function, public-key encryption, cryptographic hashing, cryptographic exponentiation, number-theoretic function, composite number based functions, discrete logarithm and exponentiation functions, random distribution of values, cryptographic hardware device manipulation, and cryptographic software device manipulation. The foregoing functions are known in the art, and thus are not described in further detail. Additionally, the example implementation is not limited thereto, and other random representations and other cryptographic variations may be substituted therefor, as would be understood by those skilled in the art.

The foregoing operations of input by M and P may be performed in any sequence, and may be further subdivided into additional stages, followed by the protocol exchange and the output stage. Further, operations may be reordered, omitted, merged and replicated as would be understood by one skilled in the art, without departing from the scope of the inventive concept.

The exchange may be performed by singular or multiple devices under the control of P and M, including other computers, such as aiding devices (e.g., cryptographic co-processor), while neither P nor M is provided with additional user information. Further, it is known in the art how to involve such parties which learn no output (for example, let M involve a specific computer to exponentiate or split its values among a few computers to exponentiate), yet help in hiding the computation, distributing it, parallelizing it, accelerating it, or monitoring it is anticipated. The example implementation thus does not exclude additional computation structures or architectures at P and/or M and/or in the communication lines and network between the parties.

For example, because operations 1.1, 1.3, 3.1, 3.3, and 3.6 may be performed on lists of values, the operation on each member of the list is substantially similar. Thus, the operation can be parallelized and be performed by different computers, CPUs, cores, and different threads of computations. When a scalable operation is performed by many threads of computation, each thread can generate an ordered list of the thread, and the lists can be joined by merging sorted lists. The example implementation allows for such scalable operation, for speed performance, as the volume of cards and transactions may increase. There are many known ways to schedule and split the work and extend computational and communication operations in the protocol, and the above examples are not limited to the example implementation.

Operations Performed Under Control of P

FIG. 3 illustrates the subset of the operations described above and illustrated in FIG. 2, that are performed under the control of P, according to an example implementation. For the sake of clarity, the foregoing operation numbers that correspond to the operations illustrated in FIG. 3 will be provided.

At 305, the set of identifiers such as credit cards which have received incentives from P are transformed into a set of non-identifiers. For example, hashing is performed on the set as explained in operation 1.1 (full domain hashing into the domain mod p) above, a random exponent is generated as explained in operation 1.2 above, using the random exponent, as explained in operation 1.3 above. Accordingly, the set of identifiers is transformed into anonymized information, i.e. non-identifiers, and this information is provided to an external processing party such as M, as explained in operation 2 above permuted.

At 310, P receives the first set of encrypted non-identifiers and an associated set of spending values. The first set of encrypted non-identifiers may correspond to anonymized information associated with a set of identifiers at the external processing party, such as credit cards which have been used at M (an external processing party such as a merchant or its representative). The anonymization of this first set of encrypted non-identifiers, as performed at M, is explained above with respect to operations 3.1, 3.2, and 3.3. The spending values may be generated as explained above with respect to operation 3.6. The first set of encrypted non-identifiers and the associated spending values may be sent as a vector of two associated values, as explained in operation 4 above.

Also at 310, P receives the second set of non-identifiers. This second set of non-identifiers may be an anonymized set of the non-identifiers provided to the external processing party at 305. This corresponds to operation 3.4 above.

At 315, P encrypts the first set of encrypted non-identifiers received from the external processing party (i.e., M's non-identifiers). For example, the encryption may be performed as explained in operation 5.1 above.

At 320, and intersect operation is performed on the encrypted set of non-identifiers generated in 315, and the second set of encrypted non-identifiers received from the external processing party as explained above at 310. This operation may be performed as described above with respect to operation 5.2.

At 325, a subset of the spending values associated with the intersecting members as determined at 320 are identified, randomized, multiplied and provided to the external processing party. This operation may be performed as described above with respect to operations 5.3, 5.4 and 6.

At 330, a decrypted randomized value is received from the external processing party, and the decrypted randomized value is used to derive a total value, based on the subset of the spending values and value used in randomized operation at 325. This operation may be performed as described above with respect operations 8 and 9.

Operations Performed Under Control of M

FIG. 4 illustrates the subset of the operations described above and illustrated in FIG. 2, which are performed under the control of M, according to an example implementation. For the sake of clarity, the foregoing operation numbers that correspond to the operations illustrated in FIG. 4 will be provided.

At 405, a set of identifiers is transformed into a set of non-identifiers. The identifiers may be associated with credit cards that have spent money at M. The identifiers may be transformed into non-identifiers by generating a random exponent and exponentiating a hashed version (full domain hashing) of the set of identifiers, as explained in operations 3.1, 3.2 and 3.3 above. Further, an anonymized set of identifiers received from an external processing party such as P may be anonymized by use of exponentiation with the generated random exponent, as explained in operation 3.4. As explained above in operation 3.5, the sets may be ordered, for example by use of permutation functions such as random permutation or identity permutation.

At 410, spending information associated with the set of identifiers, such as spending information for each of the credit cards used at M, is encrypted to generate a set of spending values. As explained above, the set of spending values is associated with the set of non-identifiers that may be associated with a credit card that have spent money at M, as a vector of two values the hashed exponentiated credit card list element and the encrypted spending value element. Encryption is performed using a public key. This operation may be performed as explained in operation 3.6 above At 415, the foregoing set of non-identifiers and the corresponding set of spending values are provided to an external processing party such as P. For example, a vector of two values may be provided that hides the credit card payment information. Further, the public key as well as the ordered and anonymized information associated with credit cards that participated in the campaign of P is also provided to the external processing party. This operation may be performed as explained in operation 4 above.

At 420, M receives and decrypts spending information associated with a subset of the spending values. The subset of the spending values may be based on the intersection between the values in the anonymized non-identifiers associated with spending at M and the anonymized non-identifiers associated with participation in the campaign by P. This operation may be performed as explained in operations 6 and 7 above. Further, the spending information may be provided as a randomized and encrypted value, as performed by the external processing party as explained in operations 5.3 and 5.4 above.

At 425, M provides the decrypted spending information to the external processing party. This operation may be performed as explained in operation 8 above.

Software Module

According to the example implementation of the operations of FIGS. 1-4, the protocol may be performed on-site or off-site under the control of M or P. For example, a software module may be employed under the control of each of the parties M and P to implement the operations. For example, the software may include a series of instructions in a computer readable medium, e.g., non-transitory.

With respect to the software module, for example, M and/or P may be provided with a measurement software package (MSP). For M, the MSP may measure a list of credit cards used by a consumer at M and a monetary value (spending) associated with the credit card, and M may only collect the list of pairs <credit-card, spending-of-card> at a storage Mstore. For P, the MSP may measure a list of credit cards participating in P's campaign, and P may collect only the set of credit cards at a storage Pstore.

The MSP may include the following modules:

(1) a random number generator (e.g., with sufficient sampling entropy under the control of M, and cryptographic pseudorandom processing);

(2) a modular exponentiation generator in a given field as determined by a domain (e.g., exponentiation over the quadratic residues modulo a large prime p, $p=2q+1$, where q is a prime itself, and where p and q are given); the exponentiation can be made in other domains such as modulo a composite, over an elliptic curve group, or the like;

(3) an additive homomorphic encryption cryptographic key generator (e.g., Paillier encryption or additive El Gamal for small useful for numbers; other examples may be substituted therefor as would be known by those skilled in the art). Optionally, this feature may not be provided for the software module at P.

(4) a cryptographic hash function (e.g., sha1, sha2, sha3), and an extended "full domain hash" for the domain to be exponentiated based on this function (or set of cryptographic functions h1, h2, . . . ).

Variations

The foregoing example implementation of the protocol may be further varied to produce additional example variations, without departing from the scope of the inventive concept. Some variations are described below.

According to a variation, P, instead of including the entire set of campaign participants, can use a subset of the participants to generate the set $\{s1, s2, \ldots, sw\}$. The basis for determining the subset may be random selection, or non-random selection (e.g., based on geography).

According to another variation, the determination of the total spending of participants can be augmented, and the set of non-participants spending can also be provided. More specifically, P may add and randomize the set under the homomorphic by multiplying the cipher texts and multiplying a random value, and infer the spending based on the decrypted value. Other sums of spending of sub-group of interest may be similarly obtained by P without M being informed (i.e., M only encrypts randomized encryptions of the sums).

According to yet another variation, by encrypting the spending $E(pay)$, $E(pay^2)$ (i.e., the square of each payment) can also be encrypted, such that the second moment can be computed (e.g., standard deviation). Encrypting $pay$, $pay^2$, $pay^3$, . . . , $pay^i$, allows for computing the i-th moment. Since sums of the exponents can provide sufficient information for derivation of the statistical moments (e.g., standard deviation), these sums can provide for this computation based on a sum of powers (e.g., sum of squares and sum of pays for the standard deviation). The computation of statistical moments is known in the art.

According to a further variation including a checking (e.g., validation) operation, P may use a credit card at M and spend, and then expect it to be in the intersect. At the end of the protocol, P can show membership of the card to M and convince M that it is the owner, at which point M discloses the relevant information of Mstore, and provides the spending, which should match P's record. This checking operation can be performed to confirm that M has included all of P's cards in the set.

According to yet another variation, P and M can agree upon the card inputs that are being used, and well-known zero-knowledge techniques can be used to assure that the parties follow the protocol. The set of cards is randomly committed to by an anonymization by a random exponents modulo p, and this hidden set is used to demonstrate in zero-knowledge that the cards used are from the committed ones; zero-knowledge techniques to assure correctness with very high probability are known in the art.

According to another variation, the final total spending may be shared with M, when consented to by the users. In this case, M trusts that P will accept its value. Alternatively, Vrand may be derived pseudorandomly (e.g., rand=hash (seed)) and when given E and V, P also gives the seed to M, which can then check the results and is assured rand was used in the protocol to randomize the total spending.

According to a further variation, if P stores names (e.g., credit cards) and M stores a one-way transformation of names (e.g., Sha2(credit-card)), or vice versa, the protocol can be executed. However, hashing of the names should be performed at the start of the protocol by the party which holds the credit card information. Other similar mappings which are computable are allowed between the two sets of credit cards at M and at P.

Other variations on the cryptography and name representation and order of exchange of information may be implemented in substitution of the foregoing operations. Additionally, other hiding methods such as employing different encryption schemes and splitting values among the parties are possible, and there are various other operations to hide and keep the information private, while computing the desired outcome privately and securely.

According to another variation, multiple occurrences of names (e.g., credit cards) may not be recognized. For example, if the same credit card id appears 5 times, the credit card number can be changed by concatenation a number to the credit number (e.g., 1, 2, 3, 4, 5) and as a result, 5 different names can be created from each credit card number id. This operation can be performed from each name on the credit card list. Accordingly, the first 5 times a name appears as representing a new name, and then any of the 5 names can be assigned to further occurrences. As a result, the histogram of names does not correspond to actual card names. Further, it cannot be determined exactly how many times each id appears at M. P can have H(id,1) H(id,2), . . . , H(id,5) in their database and M can assign one of the numbers, so that the exact number of each party is not recorded if there are duplicates. Thus, the histogram of visits may be obfuscated from P's campaign.

According to yet another variation, the program given to M can be obfuscated, to make it difficult for M to bypass the protocol. For example, but not by way of limitation, the program may be given in machine code rather than in a high level language code like C++ or Java, and may include dummy variables and redundant execution paths.

According to another variation, as long as M and P keep their exponents, the protocol can be run in batches employing the same exponents. For example, every week for a different batch with P new cards, new ids are sent exponentiated from M and the ids are obfuscated in a "week period". This incremental approach may be applied so as long as M and P maintain and use their secret exponents. Since the protocol does not require a preprocessing of the credit card numbers, it is possible to run the protocol incrementally, as long as batch aggregation is performed.

According to another variation, when an encryption is requested from M, to decrease the risk that P can access information other than the sum for decryption, a pseudorandom pad that is derived from the right member exponentiation may be applied. The pad is used to further encrypt the price value. For example, 5 dummy elements may be sent with each value, the 6 values are randomly permuted. More specifically, the following operations may be performed in this variation:

(1) When M (in operation 3), on a set of credit cards {c1, s2, . . . , cv}, computes $HH(c1)^{RM}$ (mod p), $HH(c2)^{RM}$ (mod p), . . . , $HH(cv)^{RM}$ (mod p) to generate set {hc1, hc2, . . . , hcv}, each hci is associated with another number of dummy quadratic residues chosen at random (e.g., 5 more), to generate a vector of 6 candidates. The vector of six candidates will go together (e.g., permuted as a unit, replacing hci by a 6 element vector in the foregoing protocol description).

(2) The protocol also uses hci to extract from it as a seed a pad via a pseudorandom generator creating pad(i) (e.g., hash with SHA2 the hci (and not from the dummies) 100 times, and encrypt the value repeatedly with AES to extract enough bits, or other pseudorandom generation done cryptographically).

(3) The set {E(pay(1)), . . . , E(pay(v))} is changed to {[E(pay(1) exor pad(1))], . . . , [E(pay(v) exor pad(v))] } and is provided permuted, as before (e.g., same permutation as the permutation of the 6-element vectors). Namely, the encryption of the payment is re-encrypted with the pad by the exor'ing operation.

(4) To decrypt, P finds which element of the 6 is matching in the set and then can determine how to compute pad(i) and obtain E(pay i) by exor'ing the recovered pad(i). If there is no match, P cannot recognize which of the 6 elements was used to obtain the pad. P can try to guess, but cannot assume pay(i) is recovered, and therefore, only matched elements can be used to recover the pad they created, and which was used. This is another precaution to deter P from probing on all values (e.g., obtain the summing of all pays, and determining M's income). Naturally, the probability of any dummy matching a real credit card which is anonymized is negligible.

According to another variation, the campaign may be limited by geographical area, such as an advertisement publicizing a specific restaurant (e.g., M). In this case, M may be a restaurant that only has the names of the users who paid at the restaurant by credit card; the restaurant does not have information associated with the click-on that invoked the advertisement, which directed this user to the restaurant. Alternatively, a user may be provided with a single interface to enter the credit card information commonly for M as well as P.

The foregoing protocol is for a specific domain of quadratic-residues isomorphic to Zq within Zp for a prime p and a prime q p=2q+1 and the generator is a quadratic residue.

In this domain, the Decisional Diffie-Hellman (DDH) assumption holds, i.e., it is difficult to distinguish a tuple <g, g^a, g^b, g^{a*b}> from a tuple <g, g^a,g^b,g^z,z>, for a random a,b, and z. The DDH assumption is a basis for the security of the encryption and the protocol above; when a cc^RP is sent and then a permuted set with (cc^RP)^RM=cc^{RP*RM} is returned, it cannot be located in the permuted list.

Further, all values are quadratic residues and can be seen as generated by a generator of this class: for any hashed value of cc, namely HH(cc)=g^t for a given t (t may be a randomizer of the fixed generator and therefore there exist such a t which may be unknown for each value HH(cc)) because g is a generator in the group. The full domain hash is random value and can be viewed as approximating a "random oracle", which indicates that in the above notation, the exponent randomizer t is a random unknown value.

Due to the DDH, P cannot determine the credit card values that match and can only determine the existence of a match. Due to the semantic security of the encryption scheme E, P does not learn the value of the individual spending. Due to the encryption of random value in the encryption of the sum (E(rand)), M does not know the sum of spending, and cannot correlate it with any subset. Thus, P can only determine the sum of spending and the number of the credit cards that matched, and M and P are assured that no other information is provided in the protocol.

Exponentiation can be done in other domains such as quadratic numbers modulo a composite number that is generated for the system, or over an elliptic curve (e.g., systems where the DDH assumption holds will yield a secure system). However, any commutative one-way operation with randomizers (like exponents) can be used as cryptographic primitives in the protocol.

Illustrative Example

With respect to the foregoing protocol, an example protocol result is provided as follows. For illustrative purposes only, the following encryption scheme is used. However, as explained above, the protocol may be modified in various ways, without departing from the scope of the present inventive concept.

In the following example, it is understood that P and M have agreed to use a safe prime p (p=2q+1, p and q both prime) for Pohlig Hellman exponentiation cipher:

p=0x830088f0fa044c0b (numbers starting with 0x are hexadecimal)

This p has 64 bits. The foregoing is for illustrative purposes, and as would be understood in the art, a much longer p may be used with substantially stronger encryption, for example, on the order of thousands of bits.

Operation 1.1
P has a set of credit cards (e.g., those that have participated in P's campaign):
s1="0000 0000 0000 3333"
s2="0000 0000 0000 4444"
s3="0000 0000 0000 5555"
s4="0000 0000 0000 6666"
s5="0000 0000 0000 7777"

P computes cryptographic hashes that are quadratic residues modulo p (for illustrative purposes, the example is based on HH(x)=HH'(x)^2 mod p, where HH'(x) is a SHA2based function, although a different function may be substituted therefor, as would be understood in the art):
HH(s1)=0x4c1a10d63da53b95
HH(s2)=0x6eb122a74060bd6c
HH(s3)=0x49fea36e052aff09
HH(s4)=0x7b758a0ef1263647
HH(s5)=0x4e2c91615eff7daa Operation 1.2
P selects a random Pohlig Hellman exponent in the range {1, . . . , q–1}:
RP=0x12e411d076262b7e Operation 1.3
P encrypts hashed credit card numbers:
hs1=HH(s1)^RP mod p=0x2515a3d7c64d7d39
hs2=0x81d9a74f5aaf9e6
hs3=0x166b0c6abe670b4e
hs4=0x77818087ecc76bc7
hs5=0x6abad5166be24415

Operation 2
P sorts the set {hs1, . . . , hs5} in increasing order and sends to M:
{hs1, . . . , hs5}={0x81d9a74f5aaf9e6, 0x166b0c6abe670b4e, 0x2515a3d7c64d7d39, 0x6abad5166be24415, 0x77818087ecc76bc7}

It should be noted that sorting is used in this illustrative example. However, other operations may be substituted therefor, such as random permutation.

Operation 3.1
M has a set of credit cards and payments (e.g., those that have made a purchase at M):
c1="0000 0000 0000 0000" pay(1)=500
c2="0000 0000 0000 2345" pay(2)=1000
c3="0000 0000 0000 4444" pay(3)=700
c4="0000 0000 0000 6666" pay(4)=600
c5="0000 0000 0000 1111" pay(5)=513
c6="0000 0000 0000 6543" pay(6)=5
c7="0000 0000 0000 7777" pay(7)=800

M computes hashes on credit cards:
HH(c1)=0x674d5d7c91a9c723
HH(c2)=0xa431bd22a970562
HH(c3)=0x6eb122a74060bd6c
HH(c4)=0x7b758a0ef1263647
HH(c5)=0x26e7cb50ef133dd2
HH(c6)=0x4824e784d5858f85
HH(c7)=0x4e2c91615eff7daa Operation 3.2
M chooses a random Pohlig Hellman exponent RM:
RM=0x3a0f1f6e7e8ecfb6

Operation 3.3
M encrypts its credit card numbers:
hc1=HH(c1)^RM mod p=0xa9c8a1f05b3d3e0
hc2=0x5cbdcdea582d1520
hc3=0x5fd35245ccdb5e49
hc4=0x207ee04eb8052a06
hc5=0x5b9d1f3bc358d2c5
hc6=0x4abdc0ef8ea77911
hc7=0x1333401da6f29da6

Operation 3.4
M reencrypts P's credit card numbers:
hhs1=0x81d9a74f5aaf9e6 ^RM mod p=0x38a683964f5d2e1f
hhs2=0x166b0c6abe670b4e^RM mod p=0x3975d6ad961f55ea
hhs3=0x2515a3d7c64d7d39^RM mod p=0x2e06244cbf279a1f
hhs4=0x6abad5166be24415^RM mod p=0x5db72db926d93ca5
hhs5=0x77818087ecc76bc7^RM mod p=0x1ca3636fe78f7f31

Operation 3.5

M sorts the two hashed sets:

{hhs1, . . . , hhs5}={0x1ca3636fe78f7f31, 0x2e06244cbf279a1f, 0x38a683964f5d2e1f, 0x3975d6ad961f55ea, 0x5db72db926d93ca5}

{hc1, . . . , hc7}={0xa9c8a1f05b3d3e0, 0x1333401da6f29da6, 0x207ee04eb8052a06, 0x4abdc0ef8ea77911, 0x5b9d1f3bc358d2c5, 0x5cbdcdea582d1520, 0x5fd35245ccdb5e49}

Operation 3.6:

M picks a random Paillier encryption key n=0x20148faf04f9ccd8f (this encryption key is for illustrative purposes only, and another encryption key having a different strength may be substituted therefor)

Paillier encryption key details:

n is the public encryption key and is a product of two primes:

n=p1*p2=0x140cedced*0x1999800eb we assume g=n+1 for Paillier encryption

The private decryption key is lambda=lcm(p1−1, p2−1)=0x100a47d76ba9af7dc

M encrypts payments using Paillier encryption with n as key:

E(pay(1))=0x35d2a4808a27c999390ad05b8a49c4847
E(pay(2))=0x260c04622e5d51d9c7d8b72d0213caa20
E(pay(3))=0x23a018409f5fec26b520ed862a2f80d8d
E(pay(4))=0x3add7f38e35c9d95cee0a00e90b657ccb
E(pay(5))=0x230b3565de812183aa60a28c93264c1ab
E(pay(6))=0x1dd0c3e4dddcba986f88d8f8431283cd8
E(pay(7))=0x143244ea668622bfe8b126bcfaa32b3ff This is permuted in the same order as {hc1, . . . , hc7}:

{E(pay(1)), . . . , E(pay(7))}= {0x35d2a4808a27c999390ad05b8a49c4847, 0x143244ea668622bfe8b126bcfaa32b3ff, 0x3add7f38e35c9d95cee0a00e90b657ccb, 0x1dd0c3e4dddcba986f88d8f8431283cd8, 0x230b3565de812183aa60a28c93264c1ab, 0x260c04622e5d51d9c7d8b72d0213caa20, 0x23a018409f5fec26b520ed862a2f80d8d}

Operation 4:

M sends to P the three permuted sets and the public Paillier encryption key n. The private encryption key is not sent by M to P.

Operation 5.1:

P reencrypts M's credit cards:

hhc1=0xa9c8a1f05b3d3e0^RP mod p=0x4431bb6982f45c5a hhc2=0x1333401da6f29da6^RP mod p=0x5db72db926d93ca5 hhc3=0x1ca3636fe78f7f31
hhc4=0x5c51c66b4d3e935e
hhc5=0x7eedb6459928da54
hhc6=0x1d73b30f22ab6327
hhc7=0x38a683964f5d2e1f Operation 5.2:

P finds the values that appear both in {hhs1, . . . , hhs5} and {hhc1, . . . , hhc7}:

hhc2=0x5db72db926d93ca5
hhc3=0x1ca3636fe78f7f31
hhc7=0x38a683964f5d2e1f

The corresponding encrypted payments are:

0x143244ea668622bfe8b126bcfaa32b3ff
0x3add7f38e35c9d95cee0a00e90b657ccb
0x23a018409f5fec26b520ed862a2f80d8d P cannot determine which credit cards these values correspond to, or the payment amounts amount, but P can determine that there are 3 matches.

Operation 5.3:

P picks a random number between 0 and n−1: Vrand=0x170889ba7ddd73d82 and encrypts Vrand with the public Paillier key:

E(Vrand)=0x2a0307cc5a40493daff358bdf97e17ab3

Operation 5.4:

P uses the homomorphic properties of Paillier encryption to compute the encrypted value of V:

E(V)=0x143244ea668622bfe8b126bc-faa32b3ff*0x3add7f38e35c9d95cee0a00e90b657ccb* 0x23a018409f5fec26b520ed862a2f80d8d*E(Vrand) mod n^2=0xdc0fbe774eebd52b3aef1d260a001f1a Operation 6:

P sends E(V)=0xdc0fbe774eebd52b3aef1d260a001f1a to M

Operation 7:

M decrypts E(V) using the private Paillier decryption key: V=D(0xdc0fbe774eebd52b3aef1d260a001f1a)= 0x170889ba7ddd745b6

Operation 8:

M sends V to P

Operation 9:

P computes the total payment:

V−Vrand mod n=(0x170889ba7ddd745b6− 0x170889ba7ddd73d82) mod n=2100

P knows that there are 3 matching payments and that their total amount is 2100.

In the above example, operations 3.5 and 3.6 may be performed together, and the permutations can thus be based on an ordered sorting of the exponents, instead of the payments. As such, the credit cards and payments may be sorted in a common operation, rather than reusing the same permutation in separate operations.

Example Processing Environment

Figure 5:
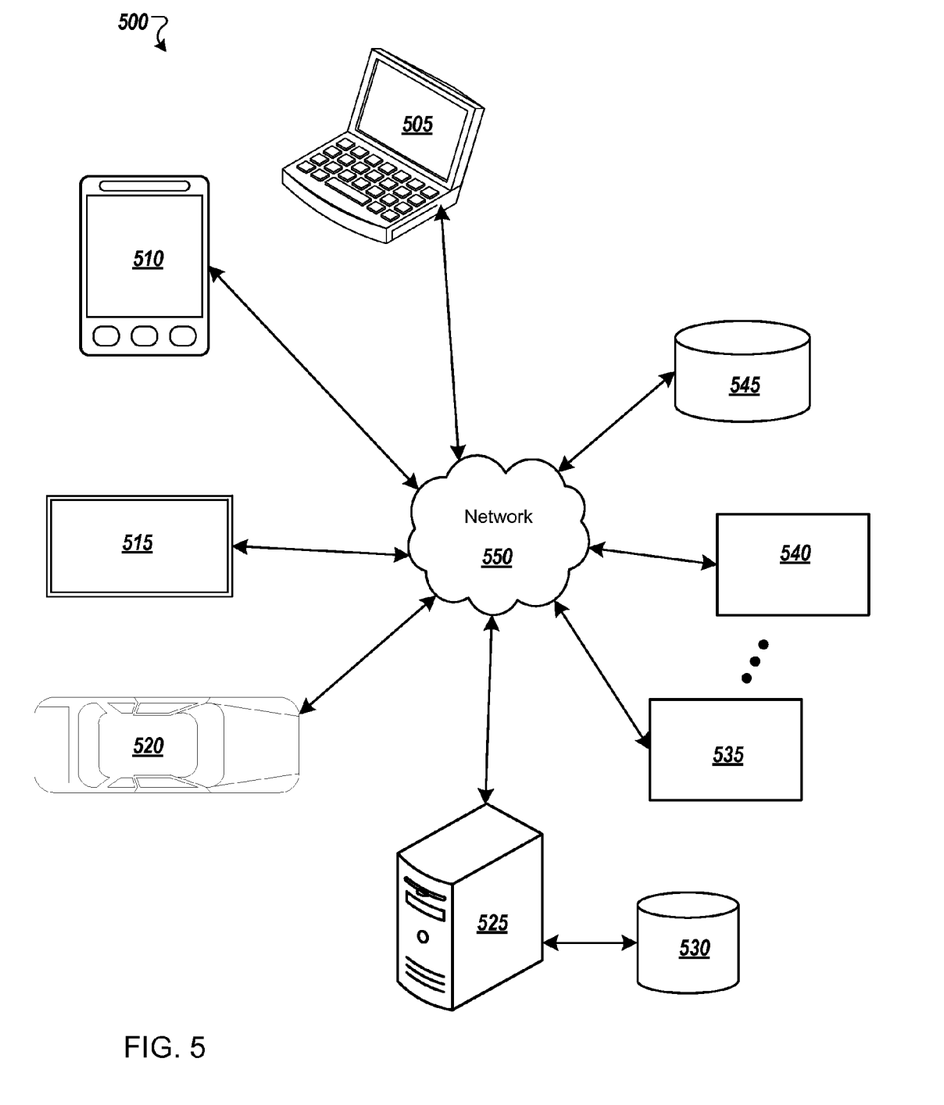
FIG. 5 illustrates an example processing environment according to the example implementation.

FIG. 5 shows an example online environment in which some example embodiments may be implemented. Environment 500 includes devices 505-545, each is communicatively connected to at least one other device via, for example, network 550. Some devices may be communicatively connected to one or more storage devices 530 and 545 (e.g., via device 525).

An example of one or more devices 505-550 may be computing device 605 described below in FIG. 6. Devices 505-550 may include, but are not limited to, a computer 525 (e.g., personal or commercial), a device associated with a vehicle 520, a mobile device 510 (e.g., smartphone), a television 515, a mobile computer 505, a server computer 550, computing devices 535-540, storage devices 530, 545. Any of devices 505-550 may access one or more services from and/or provide one or more services to one or more devices shown in environment 500 and/or devices not shown in environment 500.

A user may control a device, for example, the device 115, to access the campaign from P, which may promote the campaign via network 550, and fulfill the campaign by making a purchase from M, either offline (e.g., restaurant) or online via network 550. Information associated with the protocol may be stored under the control of P or M at storage device 530 or 545, respectively, for example.

Example Computing Environment

Figure 6:
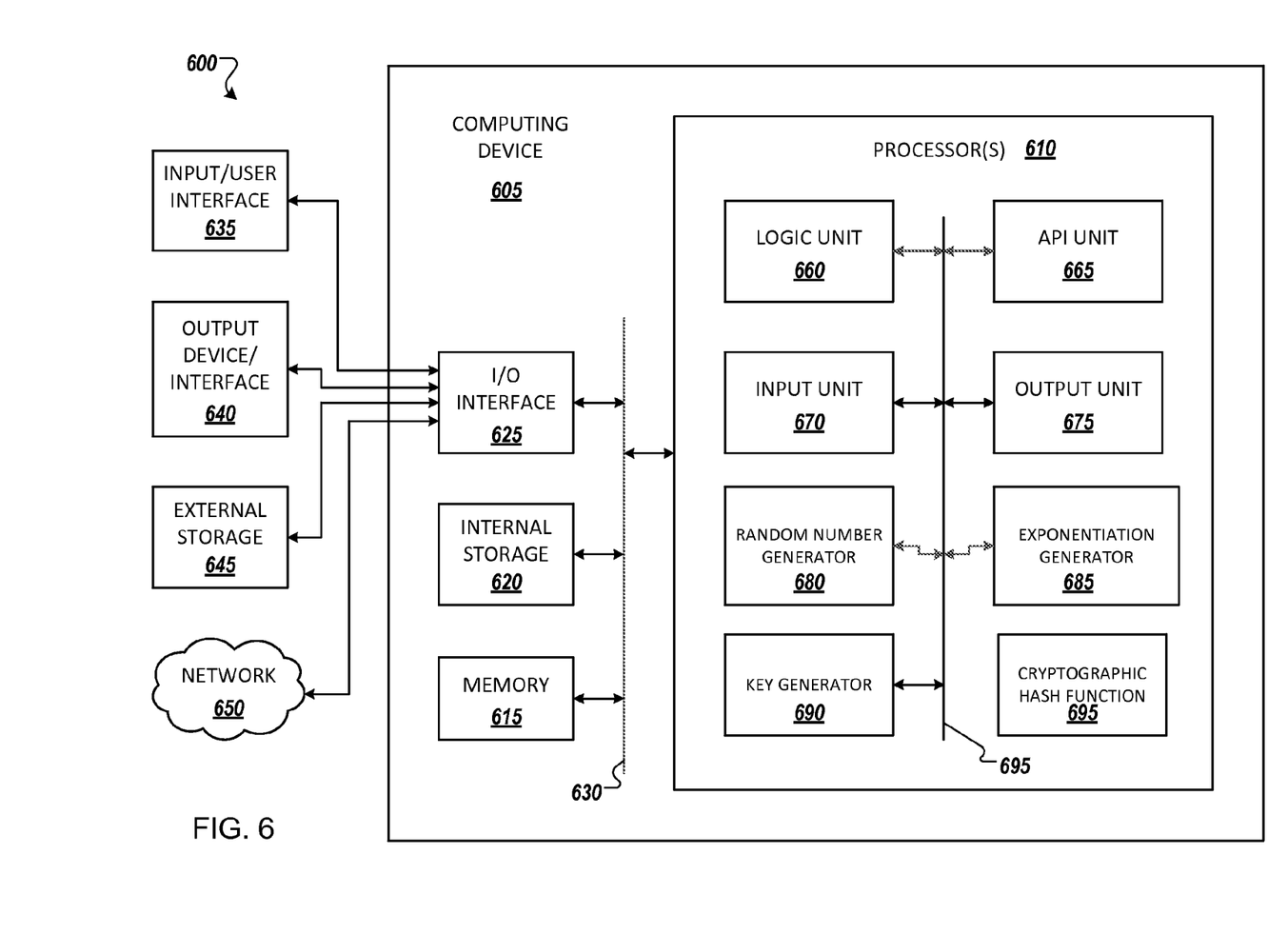
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605. The computing device 605 represents a device that may be under the control of P or M. For example, in the case of M, the computing device may include the above-defined measurement software package (MSP), and may also employ its computing device including the MSP.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, random number generator 680, exponentiation generator 685, key generator 690, and cryptographic hash function 690 for the different units to communicate with each other, with the OS, and with other applications (not shown). For example, random number generator 680, exponentiation generator 685, key generator 690, and cryptographic hash function 690 may implement one or more processes shown in FIGS. 1-4. It should be noted that optionally, the key generator 690 may not be present in the example computer environment under the control of P. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, random number generator 680, exponentiation generator 685, key generator 690, and cryptographic hash function 690). For example, input unit 670 receives a video and, via API unit 665, communicates with random number generator 680 to perform randomization. Random number generator 680 interacts with exponentiation generator 685 to provide a random exponent. Further, key generator 690 generates a public key and a private key, and cryptographic hash function 695 performs a hash function for the domain to be exponentiated.

In some instances, logic unit 660 may be configured to control the information flow among the units and direct the services provided by API unit 665, input unit 670, output unit 675, ACL objects management unit 680, ACL management unit 685, and access management unit 690 in some example implementations described above. For example, the flow of one or more processes or implementations may be controlled by logic unit 660 alone or in conjunction with API unit 665.

Other Aspects

According to the example implementation, at least one user identifier must be provided (e.g., credit card number). In situations in which the systems discussed here collect additional personal information about users, or may make use of the additional personal information, the users may be provided with an opportunity to control a degree to which programs or features collect such user information beyond the credit card number (e.g., information about a user's social network, social actions or activities, profession, a user's preferences, or a user's current location), and how that information is received. In addition, certain data may be treated in one or more ways before it is stored or used, so that personally identifiable information, e.g. other than the credit card number, is removed. For example, a user's identity may be treated so that no personally identifiable information can be determined for the name of the user, or a user's geographic location may be generalized where location information is obtained (such as to a city, ZIP code, or state level), so that a particular location of a user cannot be determined. Thus, the user may have control over the degree of information e.g., other than the credit card number, that is collected about the user.

Note that the user may divulge only an anonymized version of its name information to the parties M and P. As long as the anonymized names can be mapped to each other before hashing, the protocol does not require relating to real names, since the parties do not need real names in assessing the success of the campaign but only common random references (i.e. anonymized names). Thus, without limitation the protocol can preserve the privacy of the user and as mentioned above the protocol can be based on level of anonymization as controlled by the user or as suggested to the user.

The present example implementations may have various benefits and advantages. For example, but not by way of limitation, because other parties do not need to be trusted or involved, the method may be used without relying on added potential points of failures and the need to trust third parties, or tamper-proof devices produced by third parties.

Additionally, the example implementation provides for P to determine (e.g., calculate) the efficiency of the campaign, and may also help P to determine a correct charge for M. Further, the information may be useful to both M and P on future campaigns. The users paying with credit cards may also benefit, since being able to assess the efficiency of campaigns may incentivize merchants or merchant organization to participate in campaigns, and campaigns in general tend to be associated with certain discounts to customers. Adaptation of further campaigns based on result of efficiency assessment or campaign performance parameters is a common practice and can be added as would be understood by those skilled in the art.

Further, the example implementations may provide information related to the performance of a campaign, such as information based on at M, while not revealing other information.

Additionally, if an unauthorized party E attempts to tap one or more lines of exchange, it cannot obtain information about the campaign, other than perhaps the existence of the exchange signals themselves (e.g., message size which can be padded with irrelevant information to obfuscate the actual size as is known in the art). The restricted output is only provided to P.

The main cost is on the order of (i.e., about) v+w exponentiations and v encryption of payments. Because the first exponentiations in the doubly exponentiated sets and the encryption can be done offline, the processing requirement is reduced, and M has to do w while P has to do v exponentiations in real time. In general, since measurements are not part of fulfillment but rather determination after-the-fulfillment, this may be considered effective for the cryptographic tools being applied.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
transforming a set of identifiers indicative of participants that receive an incentive from first processing party, into a set of non-identifiers, and providing the set of non-identifiers to an external processing party, the transforming comprising,
computing, by a first computational thread of a processor, a hash function on the identifiers of the participants,
generating, by a second computational thread in parallel with the computing the hash function, a random exponent based on a random element, using a random number generator, and
exponentiating, by a third computational thread in parallel with the generating the random exponent, the hash function by the random exponent;
receiving a set of encrypted non-identifiers that comprises the set of non-identifiers after an encryption operation is performed by the external processing party, another set of non-identifiers indicative of customers of the external processing party, a set of encrypted spending values associated with the another set of non-identifiers indicative of the customers of the external processing party, and a public cryptographic key, wherein each member of the another set of non-identifiers is associated with a corresponding member of the set of spending values;
encrypting the set of non-identifiers to generate another set of encrypted non-identifiers, and determining an intersection of the set of encrypted non-identifiers and the another set of encrypted non-identifiers to generate a set of common encrypted non-identifiers indicative of an intersection between the participants associated with the first processing party and the customers associated with the external processing party;
identifying a subset of the set of encrypted spending values associated with each of the members in the set of common encrypted non-identifiers; and
computing a total spending value based on the subset of the set of spending values, the computing comprising,
performing homomorphic encryption on the subset of the set of spending values to generate encrypted spending information by generating homomorphic encryption values and a randomizing value, and multiplying the homomorphic encryption values and the randomizing value,
providing the encrypted spending information to the external processing party, wherein participants associated with encrypted spending information are unidentifiable by the external processing party, wherein the external processing party decrypts the encrypted spending information to generate decrypted spending information comprising a plaintext value,
the first processing party receiving the decrypted spending information, and
computing the total spending value based on the decrypted spending information.

2. The computer-implemented method of claim 1, wherein the method is performed without communication with a party other than the external processing party.

3. The computer-implemented method of claim 1, wherein the transforming comprises performing a full domain hash on the set of identifiers to generate a hashed set of identifiers, and exponentiating the hashed set of identifiers based on a random exponent.

4. The computer-implemented method of claim 1, wherein the encrypting comprises exponentiating the set of non-identifiers based on a generated random exponent, and the determining comprises deterministically checking the intersection between the set of encrypted non-identifiers and the another set of the encrypted non-identifiers.

5. The computer-implemented method of claim 1, wherein the identifying comprises generating and encrypting a random number, multiplying each of the spending items to generate a product, multiplying the encrypted random number by the product to generate an output result, and providing the output result to the external processing party.

6. The computer-implemented method of claim 1, wherein the external processing party comprises a merchant and the another set of non-identifiers is associated with credit card information of the customers of the merchant and the first processing party comprises a campaign promoter, and further wherein the set of identifiers comprises credit card information of credit card numbers associated with a campaign, such that the intersection represents credit card numbers of the customers of the merchant and the participants in the campaign, and wherein identities of the customers are not provided to the first processing party, and identities of the participants are not provided to the external processing party.

* * * * *